May 15, 1945.  F. L. SAVAGEAU  2,376,089
FASTENING DEVICE
Filed Nov. 11, 1943
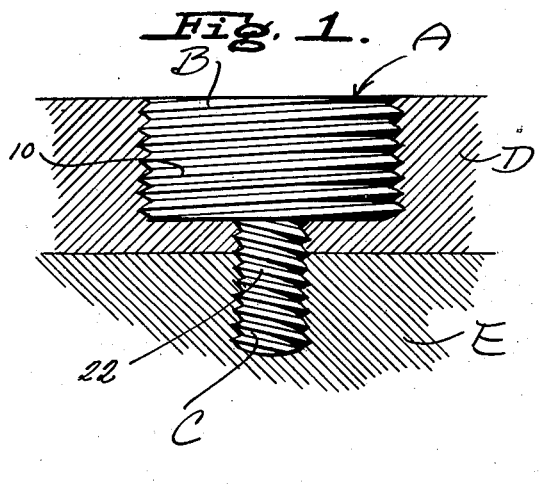
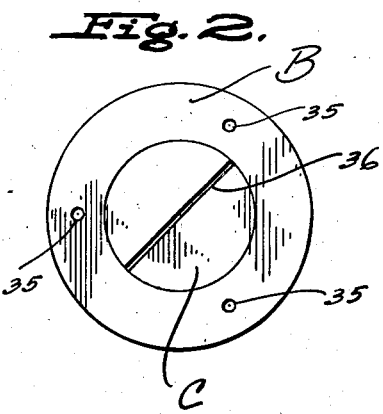
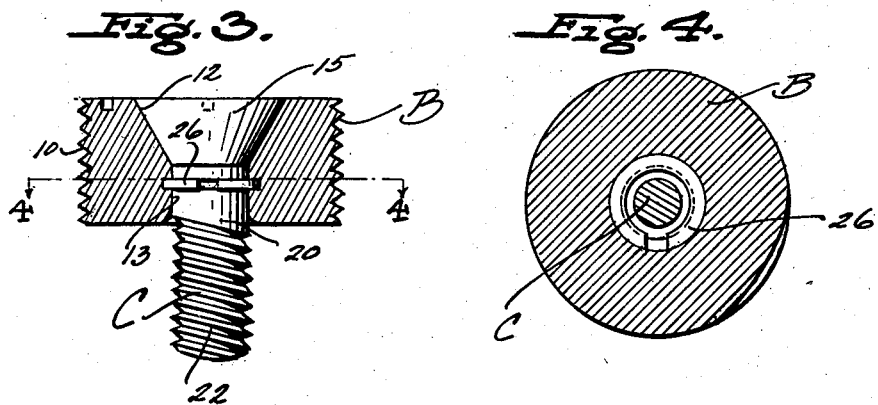
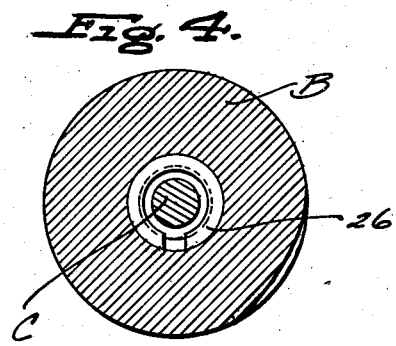
INVENTOR.
Frederick L. Savageau.
BY
ATTORNEYS.

Patented May 15, 1945

2,376,089

UNITED STATES PATENT OFFICE 2,376,089

FASTENING DEVICE

Frederick L. Savageau, Denver, Colo.

Application November 11, 1943, Serial No. 509,905

1 Claim. (Cl. 85—1)

This invention relates to improvements in fastening devices.

The primary object of this invention is the provision of a threaded fastening device partaking of the nature of a bolt assembly and consisting of a plurality of parts having screw threads which require the parts to be rotated in an exact ratio at different speeds in order to effect their attachment or detachment with respect to a part or parts to be connected or disconnected.

Other objects and advantages of this invention will be apparent from the following detailed description.

In the accompanying drawing, forming a part of this specification, and wherein similar reference characters designate corresponding parts thruout the several views, Figure 1 is a view showing the improved fastener device, holding parts of some mechanism in an assembled relation, which will not admit of detachment of the parts without the use of a special tool for rotating the members of the fastening device.

Figure 2 is a plan view of the fastener device.

Figure 3 is a cross sectional view taken thru one of the members of the fastener device showing the associated relation of a two part bolt assembly.

Figure 4 is a cross sectional view taken substantially on the line 4—4 of Figure 3.

In the drawing, wherein for the purpose of illustration shown only a preferred embodiment of the invention, the letter A may generally designate the fastener assembly, which may consist of an outer part or member B and an inner part or member C.

The parts B and C may be axially or concentrically assembled and while in the form illustrated the parts are rotatably connected together they could, under some circumstances, be threadably connected together so as to admit of the two parts being rotated at different speeds.

The part B is preferably of ring-shaped formation being externally screw threaded at 10 of a predetermined pitch. If desired, the part B could have a flanged head similar to an ordinary screw. The part B is provided with a tapered counterbore 12 in the upper portion thereof terminating in a passageway 13, to receive the shank of the bolt member C.

The bolt or fastener member C may be of the screw type having a countersunk type head 15 adapted to seat in the tapered bore 12. The member C furthermore includes a shank 20 which is rotatably seated in the lower bore 13 of the member B and extends below the member B where it is provided with external screw threading 22 of a different pitch inclination with respect to the screw threading 10 of member B.

The member C is assembled in the member B for free (non-detachable) rotation by means of an expansible split ring 26 which fits within annular grooves in the members B and C in the manner shown in Figures 3 and 4. The parts B and C may be otherwise rotatably connected together so that they may be rotated at different speeds of rotation but not readily disconnected by unauthorized persons.

In the form of invention illustrated, the member B is right hand screw threaded and the member C is left hand screw threaded altho it is to be understood that any screw threaded shank arrangement may be provided upon these members which will necessitate their rotation at different speeds to effect connection or disconnection with respect to a part or parts to be connected or disconnected.

In the form of invention shown, the top surfaces of the members B and C lie flush and the member B may be provided with openings 35 therein of the usual spanner wrench engaging type, and the exposed surface of the member C may be provided with a bit engaging slot 36.

In Figure 1 is shown the method of locking or connecting together parts D and E. These parts may be featured on any mechanism such as a meter box, electrical transformer, safe, chest, etc. In the example shown the part D is screw threaded to receive the screw threads of the part B and both parts D and E are screw threaded to receive the screw threads of the part C.

While I have not shown a special tool for the independent speed rotation of the parts B and C, a single tool can be provided with a pair of bit engaging shanks for the parts B and C which can be rotated thru a single handle or mechanism at a definite speed ratio so as to rotate the parts B and C at the desired speed differential in order to insure their connection or disconnection with a part or parts, such as shown in Figure 1.

The term "pitch inclination" in this specification and the attached claim means the degree of slope or descent of the threads with respect to a plane normal to the axis of the fastener member.

Various changes in the shape, size and arrangement of parts may be made to the form of invention herein shown and described, without departing from the spirit of the invention or the scope of the following claim.

I claim:

In combination with a pair of parts to be fastened together, said parts having cooperatively aligned threaded openings of predetermined pitch slope, and one of said parts having an enlarged threaded socket open to the sockets first mentioned of a predetermined different degree of pitch slope, a pair of fastener members relatively rotatably connected together for non-axial movement including a member having external threads of a pitch slope for threading in the enlarged socket of one of the aforesaid parts, the other fastener member having a threaded portion of the same pitch slope as the first mentioned threaded sockets of said parts and adapted to threadably interfit therewith, whereby it is necessary to relatively rotate the screw threaded fastener members at different speed ratios in order to simultaneously effect connection or disconnection with respect to said parts.

FREDERICK L. SAVAGEAU.